United States Patent
Ljung

(10) Patent No.: US 9,642,066 B2
(45) Date of Patent: May 2, 2017

(54) NETWORK-CONTROLLED ADAPTIVE TERMINAL BEHAVIOR MANAGING HIGH-NETWORK-LOAD SCENARIOS

(75) Inventor: Rickard Ljung, Helsingborg (SE)

(73) Assignees: SONY CORPORATION, Tokyo (JP); SONY MOBILE COMMUNICATIONS INC., Tokyo (JP)

( * ) Notice: Subject to any disclaimer, the term of this patent is extended or adjusted under 35 U.S.C. 154(b) by 120 days.

(21) Appl. No.: 13/823,360

(22) PCT Filed: Mar. 30, 2012

(86) PCT No.: PCT/IB2012/051575
§ 371 (c)(1),
(2), (4) Date: Mar. 14, 2013

(87) PCT Pub. No.: WO2013/144683
PCT Pub. Date: Oct. 3, 2013

(65) Prior Publication Data
US 2014/0092734 A1    Apr. 3, 2014

(51) Int. Cl.
*H04W 48/06* (2009.01)
*H04L 12/801* (2013.01)
*H04L 12/54* (2013.01)
*H04L 12/911* (2013.01)
*H04W 28/02* (2009.01)

(52) U.S. Cl.
CPC ........... *H04W 48/06* (2013.01); *H04L 12/569* (2013.01); *H04L 47/10* (2013.01); *H04L 47/72* (2013.01); *H04W 28/0289* (2013.01); *H04W 28/0205* (2013.01)

(58) Field of Classification Search
CPC ............. H04W 48/06; H04W 28/0289; H04W 28/0205; H04L 47/72; H04L 12/569
USPC .................................................. 370/230, 235
See application file for complete search history.

(56) References Cited

U.S. PATENT DOCUMENTS

| 7,843,828 B2 * | 11/2010 | Key et al. ...................... 370/235 |
| 2006/0013192 A1 * | 1/2006 | Le ........................ H04L 63/0281 370/351 |
| 2011/0199898 A1 * | 8/2011 | Cho et al. ..................... 370/230 |

(Continued)

FOREIGN PATENT DOCUMENTS

| EP | 1032236 | 3/2000 |
| JP | 200178260 | 3/2001 |
| WO | 2011135790 | 3/2011 |

OTHER PUBLICATIONS

3GPP "3rd Generation Partnership Project; Technical Specification Group Services and System Aspects; System Improvements for Machine-Type Communications (Release II)"; Technical Report; Feb. 2012; pp. 1-166; vol. 1.6.1; France.

(Continued)

*Primary Examiner* — Chi H Pham
*Assistant Examiner* — Mandish Randhawa
(74) *Attorney, Agent, or Firm* — Tucker Ellis LLP

(57) ABSTRACT

A network device may detect a high traffic load for a wireless access network associated with the network device, and broadcast, to mobile terminals in the wireless access network associated with the network device, a signaling message indicating the high traffic load. The signaling message causes a mobile terminal to selectively limit wireless network access requests to the network device.

18 Claims, 6 Drawing Sheets

(56) References Cited

U.S. PATENT DOCUMENTS

2012/0236717 A1* 9/2012 Saska et al. ............... 370/235
2014/0056134 A1* 2/2014 Koskinen et al. .......... 370/230

OTHER PUBLICATIONS

3GPP "General Packet Radio Service (GPRS) Enhancements for Evolved Universal Terrestrial Radio Access Network (E-UTRAN) Access (Release II)"; Technical Specification; Dec. 16, 2011; pp. 1-32; vol. 11.1.0.
Seirra Wireless "Broadcasting MTC Group Access Control for Overload Control"; May 4, 2011; pp. 1-6; vol. SA WG2; France.
K. Ramakrishnan; "The Addition of Explicit Congestion Notification(ECN) to IP; rtc3168.txt"; Sep. 1, 2001; pp. 1-64.
Alcatel-Lucent et al.; "Reporting of RAN Congestion Levels"; Feb. 6, 2012; p. 1; vol. SA WG1; Kyoto Japan.
ATIS "Network Optimization Focus Group (NetOp-FG) Assessment and Recommendations"; Nov. 8, 2011; France.
International Search Report and Written Opinion issued in corresponding application PCT/IB2012/05157 dated Dec. 5, 2012.

* cited by examiner

NETWORK-CONTROLLED ADAPTIVE TERMINAL BEHAVIOR MANAGING HIGH-NETWORK-LOAD SCENARIOS

BACKGROUND

In a mobile communication system one or more mobile terminals are connecting to one or more base stations, and each base station may deploy one or more so-called "cells" for handling the mobile traffic to/from terminals. The base stations and their active cells are typically deployed at positions selected to handle a certain amount of total network load generated by traffic to/from the mobile terminals. However, in some cases, many mobile terminals are simultaneously connecting to the same cell such that the total traffic load may be too high to handle all the traffic requests from the mobile terminals. This may be caused by an unexpected high amount of terminals located in the same geographical area, and/or that the amount of data each terminal is requesting to be transmitted in a cell has increased to a level that is higher than the cells for one or more base stations can manage. Recent growth in data traffic due to the evolution of smartphones is one example of increased traffic demands creating problems with respect to total capacity in mobile communication systems.

When a network is overloaded due to high traffic demand from terminals, the users utilizing the mobile terminals can experience difficulties connecting to the cells. Typical user impact can be dropped calls, high call setup failure rates, and/or high latency in data sessions (e.g., when accessing the Internet via the mobile network).

SUMMARY

According to one aspect, a method may include detecting a high traffic load for a wireless access network associated with the network device and sending, via a broadcast channel and to multiple mobile terminals, a signaling message indicating the high traffic load. The signaling message may be configured to be received by a mobile terminal of the multiple mobile terminals and to cause the mobile terminal to selectively limit wireless network access requests in a manner particular to the mobile terminal.

Additionally, utilization information associated with the wireless access network may be monitored.

Additionally, access requests may be received from the plurality of mobile terminals.

Additionally, the signaling message may be included in a system information block.

Additionally, the system information block may include a one-bit block configured to indicate one of a normal traffic load or a high traffic load for the wireless access network, or a two-bit block configured to indicate one of multiple traffic load levels for the wireless access network.

Additionally, detecting the high traffic load may include comparing a current usage level to a particular capacity threshold or identifying a trend toward a particular capacity limit that is projected to be achieved within a certain time period.

Additionally, mobile-terminal-specific restrictions to reduce access requests to the network device may be applied based on the signaling message indicating the high traffic load.

Additionally, the network device may include a base station for the wireless access network.

Additionally, a normal traffic load for the wireless access network associated with the network device may be detected and a signaling message indicating the normal traffic load may be sent via the broadcast channel. The signaling message may be configured to be received by the mobile terminal and to cause the mobile terminal to terminate the selective limits to wireless network access requests by the mobile terminal.

According to another aspect, a network device may include a memory to store instructions and a processor. The processor may execute the instructions in the memory to detect a high traffic load for a wireless access network associated with the network device and to broadcast, to mobile terminals in the wireless access network associated with the network device, a signaling message indicating the high traffic load. The signaling message may cause a mobile terminal to selectively limit wireless network access requests to the network device.

Additionally, the processor may be further configured to monitor utilization information associated with the wireless access network.

Additionally, the signaling message may be broadcast using a designated broadcast channel for the network device.

Additionally, the signaling message is included within a system information block delivered via the broadcast channel.

Additionally, the signaling message may include a one-bit indicator.

Additionally, the signaling message may include a two-bit indicator.

Additionally, when detecting the high traffic load, the processor is further configured to execute instructions in the memory to compare a current usage level to a particular capacity threshold, or identify a trend toward a particular capacity limit that is projected to be achieved within a certain time period.

Additionally, the network device may include a base station for the wireless access network.

According to yet another aspect, a non-transitory computer-readable medium including instructions executable by at least one processor may include one or more instructions to detect a high traffic load for a wireless access network associated with a network device; one or more instructions to send, via a broadcast channel, a signaling message indicating the high traffic load; one or more instructions to detect a return to a normal traffic load for the wireless access network; and one or more instructions to send, via the broadcast channel, another signaling message indicating the normal traffic load.

Additionally, the one or more instructions to send the signaling message may include one or more instructions to provide an indicator bit in a system information block for the wireless access network.

Additionally, one or more instructions to monitor utilization information associated with the wireless access network may be provided.

BRIEF DESCRIPTION OF THE DRAWINGS

The accompanying drawings, which are incorporated in and constitute a part of this specification, illustrate one or more embodiments described herein and, together with the description, explain the embodiments. In the drawings:

FIG. 6 is a flow diagram of an exemplary process for adaptively managing high network loads according to an implementation described herein.

DETAILED DESCRIPTION

The following detailed description refers to the accompanying drawings. The same reference numbers in different drawings may identify the same or similar elements.

Under existing Third Generation Partnership Project (3GPP) specifications, a wireless network can reject or accept connection attempts. A rejected connection can be signaled with a so-called "reject cause" indicating the reason for not accepting a request from a mobile terminal. The reject causes are described in the technical specification denoted as 3GPP TS 24.008 for Wideband Code Division Multiple Access (WCDMA) networks and TS 24.301 for Long-Term Evolution (LTE) networks, respectively. The cause values include options to signal one of several different reasons for a network to reject a connection, such as that a terminal is not accepted (blocked), the network has a failure, or the network is congested. Hence, in current standards there is a possibility for network to indicate to a certain mobile terminal that a network is congested. However, such an indication is provided only to one mobile terminal at a time, and via this signaling, the requested connection is already rejected.

Under current 3GPP standards, the network does not indicate to mobile terminals in advance that a network load is getting close to its limit and that there is a risk to reject session setups. Instead current standards provide a reactive rejection when the unwanted overloaded situation has already occurred. Hence, it would be beneficial if mobile terminals could be informed about a high load scenario and dynamically reduce less critical traffic requests to avoid the unwanted user experience of reactive rejections.

Systems and/or methods described herein may enable base stations to indicate to mobile terminals (e.g., wireless terminals) in a particular cell a high network load situation. Mobile terminals may use the indications from the base station to reduce non-critical access requests and, thus, increase tolerance of the mobile network to short-term high load situations.

Figure 1:
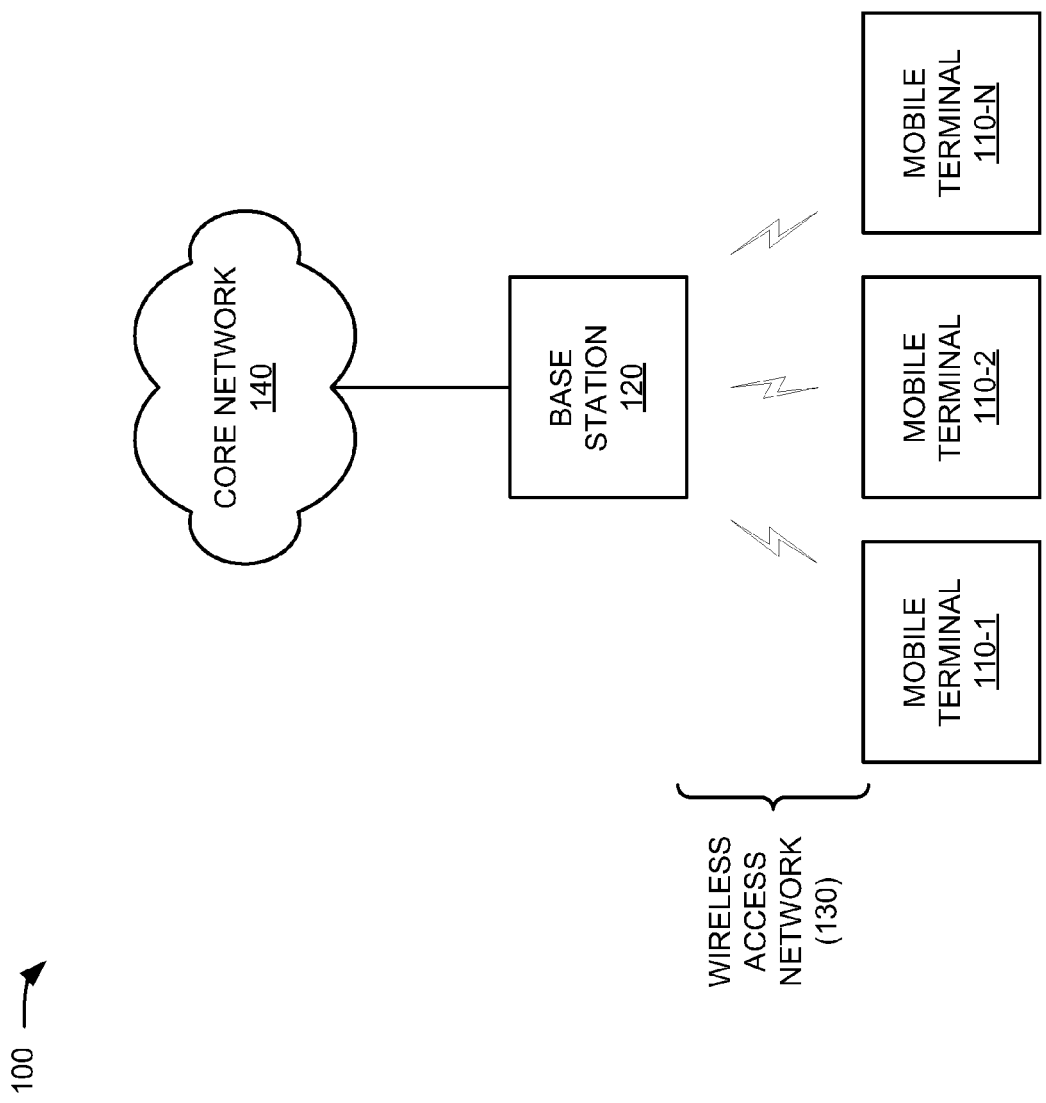
FIG. 1 shows an exemplary system in which concepts described herein may be implemented.

FIG. 1 is a diagram of an exemplary network 100 in which systems and/or methods described herein may be implemented. As illustrated, network 100 may include mobile terminals 110-1 through 110-N (referred to herein collectively as "mobile terminals 110" and generically as "mobile terminal 110"), a base station 120, a wireless access network 130, and a core network 140. Components of network 100 may interconnect via wired and/or wireless connections. Three mobile terminals 110, one base station 120, one wireless access network 130, and one core network 140 have been illustrated in FIG. 1 for simplicity. In practice, there may be more mobile terminals 110, base stations 120, wireless access networks 130, and/or core networks 140. Also, in some instances, one or more of the components of network 100 may perform one or more functions described as being performed by another one or more of the components of network 100.

Mobile terminal 110 may include one or more devices capable of sending/receiving information (e.g., voice, data, broadband applications, etc.) to/from base station 120 via wireless access network 130. Mobile terminal 110 may include, for example, a radiotelephone, a personal communications system (PCS) terminal (e.g., that may combine a cellular radiotelephone with data processing and data communications capabilities), a wireless device (e.g., a wireless telephone), a cellular telephone, a smart phone, a gaming system, or other types of mobile communication devices. In some instances, mobile terminal 110 may be referred to as user equipment (UE).

Base station 120 may include one or more computation and/or communication devices that receive voice and/or data from core network 140 and transmit that voice and/or data to mobile terminal 110 via wireless access network 130. Base station 120 may also include one or more devices that receive voice and/or data from mobile terminal 110 via wireless access network 130 and transmit that voice and/or data to core network 140 or to other mobile terminals 110. Base station 120 may also monitor resource utilization information of wireless access network 130. For example, base station 120 may monitor traffic patterns (e.g., packet data traffic patterns) associated with network 100 (e.g., associated with mobile terminal 110, base station 120, wireless access network 130, and/or core network 140), and may control utilization of network 100 and resources of network 100 based on the monitored traffic patterns. In an implementation, base station 120 may broadcast control messages, such as system information block (SIB) signaling messages, to mobile terminals 110 to provide network load conditions. Base station 120 may also enforce quality-of-service (QoS) constraints due to congestion in wireless access network 130. In some cases, base station 120 may take the form of an eNodeB.

Wireless access network 130 may include, for example, a wireless interface between base station 120 and mobile terminals 110. Wireless access network 130 may correspond to, for example, a LTE network or a WCDMA network. Portions of wireless access network 130 may include individual cells supported by one or more base stations 120. For each individual cell, base station(s) 120 may provide cell-specific configuration information, via a broadcast channel, to all mobile terminals 110 within the cell. Core network 140 may include one or more resources (e.g., devices, components, etc.) that transfer/receive information (e.g., voice, data, broadband applications, etc.) to a circuit-switched and/or packet-switched network. In one implementation, core network 140 may include resources such as, for example, a radio network controller (RNC), a policy and charging rules function (PCRF), a Mobile Switching Center (MSC), a Gateway MSC (GMSC), a Media Gateway (MGW), a Serving General Packet Radio Service (GPRS) Support Node (SGSN), a Gateway GPRS Support Node (GGSN), and/or other devices. In one implementation, core network 150 may include devices implementing standards to support a wireless access network.

Figure 2:
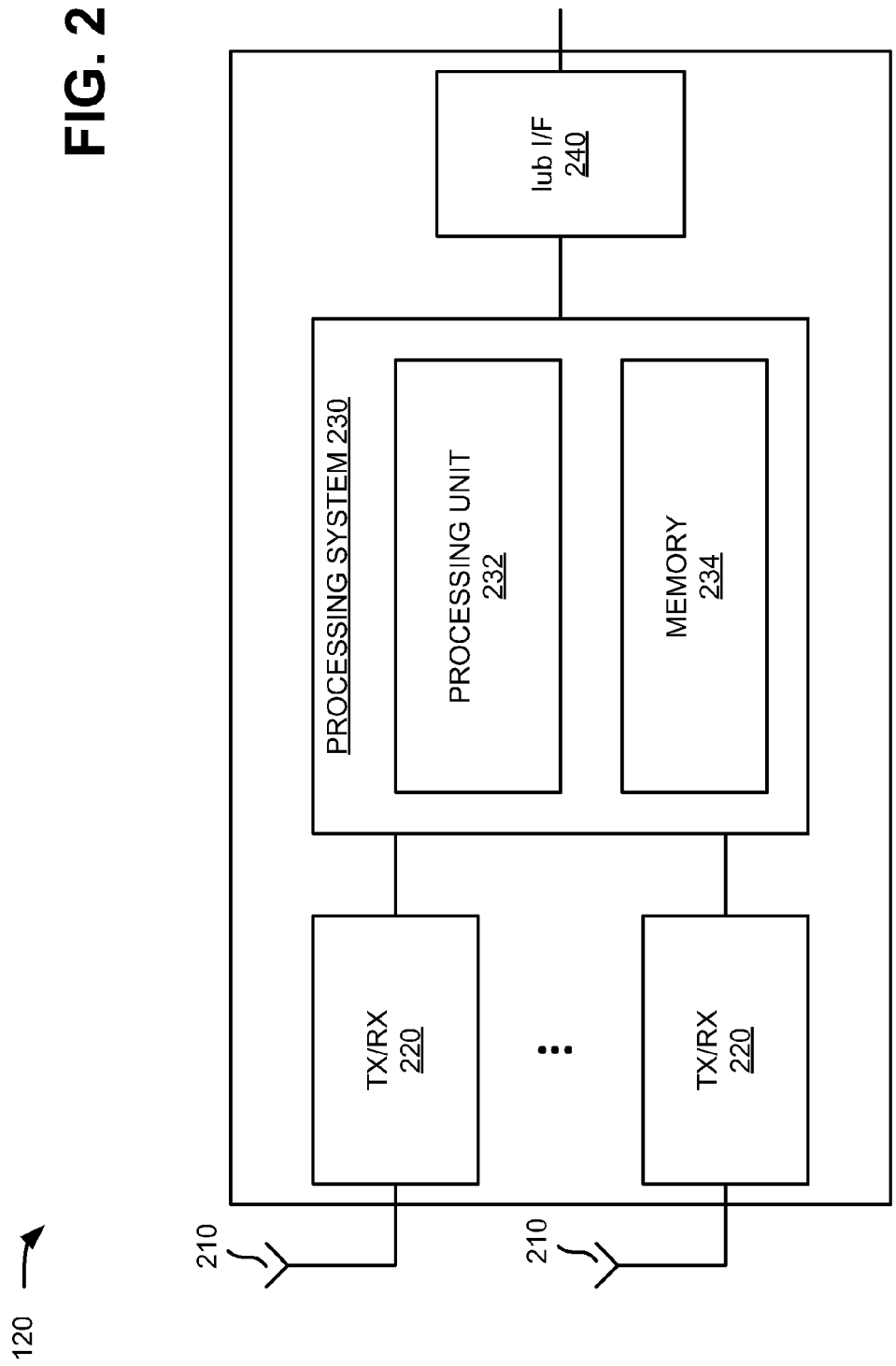
FIG. 2 is a block diagram of exemplary components of a base station of FIG. 1.

FIG. 2 is a diagram of exemplary components of base station 120. As shown in FIG. 2, base station 120 may include antennas 210, transceivers (TX/RX) 220, a processing system 230, and an Iub interface (I/F) 240.

Antennas 210 may include one or more directional and/or omni-directional antennas. Transceivers 220 may be associated with antennas 210 and may include transceiver circuitry for transmitting and/or receiving symbol sequences in a network, such as network 100, via antennas 210.

Processing system 230 may control the operation of base station 120. Processing system 230 may also process information received via transceivers 220 and Iub interface 240. Processing system 230 may further measure quality and strength of a connection, may determine the distance to user equipment. As illustrated, processing system 230 may include a processing unit 232 and a memory 234.

Processing unit 232 may include one or more processors, microprocessors, application specific integrated circuits (ASICs), field programmable gate arrays (FPGAs), or the like. Processing unit 232 may process information received via transceivers 220 and Iub interface 240. The processing may include, for example, data conversion, forward error correction (FEC), rate adaptation, WCDMA spreading/dispreading, quadrature phase shift keying (QPSK) modulation, etc. In addition, processing unit 232 may transmit control messages and/or data messages, and may cause those control messages and/or data messages to be transmitted via transceivers 220 and/or Iub interface 240. In one implementation, the control messages may include system information block signaling messages that are broadcast to all mobile terminals (e.g., mobile terminals 110) within range of base station 120. Processing unit 232 may also process control messages and/or data messages received from transceivers 220 and/or Iub interface 240.

Memory 234 may include a random access memory (RAM), a read-only memory (ROM), and/or another type of memory to store data and instructions that may be used by processing unit 232.

Iub interface 240 may include one or more line cards that allow base station 120 to transmit data to and receive data from a radio network controller and other devices in network 100.

As described herein, base station 120 may perform certain operations in response to processing unit 232 executing software instructions of an application contained in a computer-readable medium, such as memory 234. A computer-readable medium may be defined as a non-transitory memory device. A memory device may include space within a single physical memory device or spread across multiple physical memory devices. The software instructions may be read into memory 234 from another computer-readable medium or from another device via antennas 210 and transceivers 220. The software instructions contained in memory 234 may cause processing unit 232 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows exemplary components of base station 120, in other implementations, base station 120 may contain fewer, different, differently-arranged, or additional components than depicted in FIG. 2. Alternatively, or additionally, one or more components of base station 120 may perform one or more other tasks described as being performed by one or more other components of base station 120.

Figure 3:
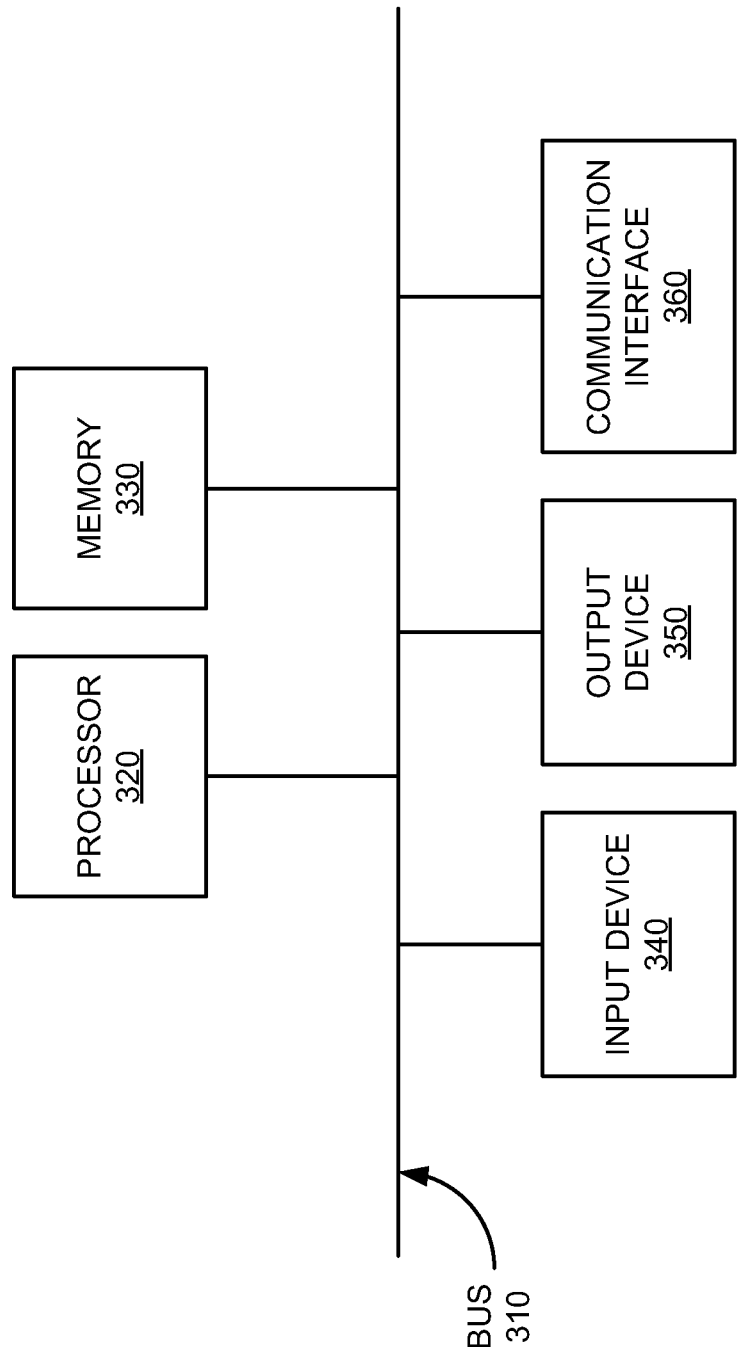
FIG. 3 is a block diagram of exemplary components of another device of FIG. 1.

FIG. 3 is a diagram of exemplary components of a device 300. Device 300 that may correspond to mobile terminal 110. In some implementations, device 300 may also correspond to base station 120. Each mobile terminal 110 or base station 120 may include one or more devices 300. As shown in FIG. 3, device 300 may include a bus 310, a processor 320, a memory 330, an input device 340, an output device 350, and a communication interface 360.

Bus 310 may permit communication among the components of device 300. Processor 320 may include one or more processors or microprocessors that interpret and execute instructions. In other implementations, processor 320 may be implemented as or include one or more ASICs, FPGAs, or the like.

Memory 330 may include a RAM or another type of dynamic storage device that stores information and instructions for execution by processor 320, a ROM or another type of static storage device that stores static information and instructions for the processor 320, and/or some other type of magnetic or optical recording medium and its corresponding drive for storing information and/or instructions.

Input device 340 may include a device that permits an operator to input information to device 300, such as a keyboard, a keypad, a mouse, a pen, a microphone, one or more biometric mechanisms, and the like. Output device 350 may include a device that outputs information to the operator, such as a display, a speaker, etc.

Communication interface 360 may include a transceiver (e.g., a transmitter and/or receiver) that enables device 300 to communicate with other devices and/or systems. For example, communication interface 360 may include mechanisms for communicating with other devices, such as other devices of network 100 or another device 300.

As described herein, device 300 may perform certain operations in response to processor 320 executing software instructions contained in a computer-readable medium, such as memory 330. The software instructions may be read into memory 330 from another computer-readable medium or from another device via communication interface 360. The software instructions contained in memory 330 may cause processor 320 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows exemplary components of device 300, in other implementations, device 300 may include fewer components, different components, differently-arranged components, or additional components than depicted in FIG. 3. As an example, in some implementations, input device 340 and/or output device 350 may not be implemented by device 300. In these situations, device 300 may be a "headless" device that does not explicitly include an input or an output device. Alternatively, or additionally, one or more components of device 300 may perform one or more other tasks described as being performed by one or more other components of device 300.

Figure 4:
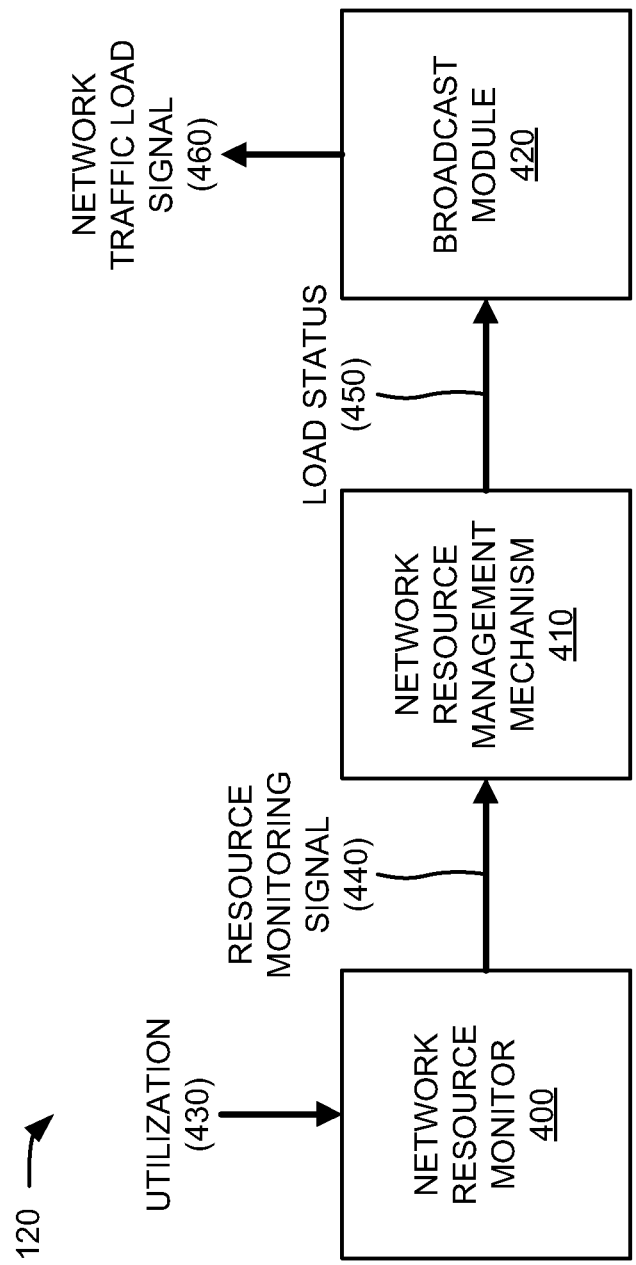
FIG. 4 is a block diagram of exemplary functional components of a base station of FIG. 1.

FIG. 4 is a block diagram of exemplary functional components of base station 120. In one implementation, the functions described in connection with FIG. 4 may be performed by processing system 230. In another implementation, the functions described in connection with FIG. 4 may be performed by one or more components of device 300 (FIG. 3). As shown in FIG. 4, base station 120 may include a network resource monitor 400, a network resource management mechanism 410, and a broadcast module 420.

Network resource monitor 400 may include hardware or a combination of hardware and software that may receive utilization information 430 associated with network 100 (e.g., mobile terminal 110, base station 120 and/or core network 140). Utilization information 430 may include bandwidth utilization by mobile terminal 110, base station 120, components of core network 140, traffic rates (e.g., in packets per second) associated with mobile terminal 110, base station 120, components of core network 140, etc. Network resource monitor 400 may output a resource monitoring signal 440 to network resource management mechanism 410. Resource monitoring signal 440 may include, for example, information identifying a percentage of spectrum that is currently available for wireless access to base station 120. In one implementation, network resource monitor may send resource monitoring signal 440 at regular intervals and/or as network conditions change.

Network resource management mechanism 410 may include hardware or a combination of hardware and software that may receive resource monitoring signal 440 and determine if mitigation procedures are necessary to reduce network congestion. For example, network resource management mechanism 410 may determine if resource monitoring signal 440 is indicative of a heavy traffic load that could cause congestion for wireless access to base station 120. In one implementation, network resource management mechanism 410 may normalize resource monitoring signal 440 to limit false positives. For example, network resource management mechanism 410 may compare multiple resource monitoring signals 440 over a time period to ensure all (or a particular percentage) of the multiple signals are above a congestion threshold (e.g., a threshold determined by a network administrator). In another implementation, network resource management mechanism 410 may compare multiple signals to detect a network load trend (e.g., to predict a network congestion event before one actually occurs). For example, network resource management mechanism 410 may identify a trend toward a particular capacity limit that is projected to be achieved within a certain time period.

Network resource management mechanism 410 may provide a network load status 450 to broadcast module 420. Network load status 450 may provide an indication (e.g., based on interpretation of one or more resource monitoring signals 440) of a network load for base station 120. In one implementation, network load status 450 may be a two-level indication (e.g., "normal" or "high"). In another implementation, network load status 450 may include additional level indications (e.g., "normal," "med-high," "high," or "congested").

Broadcast module 420 may receive network load status 450 and may broadcast a network traffic load signal 460 to mobile terminals 110. In one implementation, network traffic load signal 460 may be distributed via a cell-specific broadcast channel for base station 120. For example, network traffic load signal 460 may be included as an additional signal in the SIBs that give all mobile terminals 110 camping in a particular cell (e.g., a portion of wireless access network 130 supported by a particular base station 120) specific protocol information, such as mobility handling and control information. SIBs may be mapped to a broadcast channel (BCH) for a particular wireless access protocol. For example, 3GPP TS 25.211 describes BCH mapping for WCDMA, while 3GPP TS 36.211 describes BCH mapping for LTE. In implementations described herein, an additional system information block may be defined for broadcasting information on the current traffic load for the cell associated with a particular base station (e.g., base station 120). For example, in the case of WCDMA and LTE, 3GPP TS 25.211 and 3GPP TS 36.211, respectively, may be changed to add a new SIB that indicates the current cell traffic load. The new SIB may be a one-bit signal indicating, for example, either a normal traffic load or high traffic load. In another implementation, the new SIB may be a two-bit signal indicating up to four different network traffic levels (e.g., "normal," "med-high," "high," or "congested").

Although FIG. 4 shows exemplary functional components of base station 120, in other implementations, base station 120 may contain fewer, different, differently-arranged, or additional functional components than depicted in FIG. 4. Alternatively, or additionally, one or more functional components of base station 120 may perform one or more other tasks described as being performed by one or more other functional components of base station 120.

Figure 5:
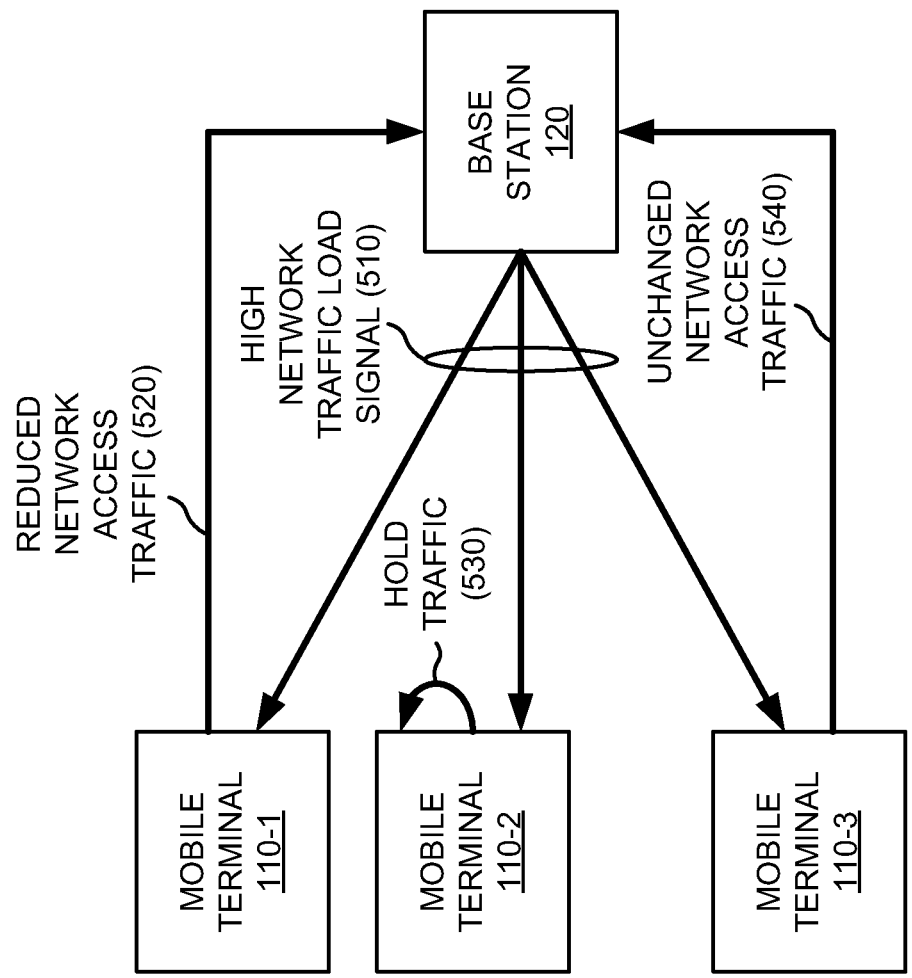
FIG. 5 is diagram of exemplary interactions among components of a portion of the network of FIG. 1.

FIG. 5 is diagram of exemplary interactions among components of a portion 500 of network 100. As shown in FIG. 5, network portion 500 may include mobile terminals 110-1, 110-2, and 110-3 and base station 120. Assume that mobile terminals 110-1 through 110-3 connect to base station 120 via wireless access network 130.

Base station 120 may broadcast a high network traffic load signal 510 to all devices camping in the coverage area of base station 120, including mobile terminals 110-1 through 110-3. In one implementation, high network traffic load signal 510 may correspond to network traffic load signal 460 when network traffic load signal 460 includes a high load indicator. High network traffic load signal 510 may be broadcast, for example, as part of a group of system information blocks relevant to base station 120.

Mobile terminals 110-1 through 110-3 may each receive high network traffic load signal 510 and may individually adjust network connectivity based on high network traffic load signal 510. Generally, mobile terminals 110 may have various reasons to initiate a connection with base station 120. For example, a connection can be directly initiated by a user (e.g., starting a voice call or launching an application), or a connection can be automatically initiated by various background activities, such as automatic synchronizations with email, calendar, weather, and/or social networking services. Even through data sessions can be initiated for various reasons, each connection will increase the instantaneous traffic load in wireless access network 130. According to implementations described herein, cell load information broadcasted to mobile terminals 110 (e.g., via network traffic load signal 460) may permit cell load information to be taken into account at mobile terminal 110 before initiating traffic requests. In a situation where network traffic load signal 460 indicates a high load situation (e.g., high network traffic load signal 510), each of mobile terminals 110 individually has an opportunity to change its network connection behavior and avoid negative user experiences. That is, each of mobile terminals 110-1 through 110-3 may respond differently to high network traffic load signal 510.

For example, in response to high network traffic load signal 510, mobile terminal 110-1 may adjust its network connection behavior to reduce non-critical access requests. Mobile terminal 110-1 may represent a device with a combination of critical and non-critical traffic. As indicated by reference number 520, mobile terminal 110-1 may provide reduced network access traffic in response to high network traffic load signal 510. For example, mobile terminal 110-1 may change a background updating interval for email, weather and social network services; may cancel or postpone certain network access attempts; may delay background software updates; etc.

Mobile terminal 110-2 may also adjust its network connection behavior in response to high network traffic load signal 510. Mobile terminal 110-2 may represent a device with only non-critical traffic. For example, mobile terminal 110-2 may include a mobile terminal in a standby mode. As indicated by reference number 530, mobile terminal 110-2 may temporarily hold network access traffic in response to high network traffic load signal 510. For example, mobile terminal 110-2 may delay automatic updates, synchronizations, etc., while mobile terminal 110-2 is in standby mode.

In contrast with mobile terminals 110-1 and 110-2, mobile terminal 110-3 may not adjust its network connection behavior in response to high network traffic load signal 510. In one implementation, mobile terminal 110-3 may represent a device with only critical (e.g., user initiated) traffic. For example, mobile terminal 110-3 may have an active voice or streaming session with no other background data. In another implementation, mobile terminal 110-3 may include a device that is not configured to recognize network traffic load signal 460 generally or high network traffic load signal 510 particularly. As indicated by reference number 540, network traffic between mobile terminal 110-3 and base station 120 may remain unchanged in response to high network traffic load signal 510.

As shown in FIG. 5, use of network traffic load signal 460 to regulate traffic over wireless access network 130 is backwards compatible, since no immediate additional response signal is requested from any mobile terminal 110. For example, a legacy terminal (e.g., mobile terminal 110-3) not capable of reading network traffic load signal 460 would not be required/expected to respond to network traffic load signal 460. Furthermore, mobile terminals 110 that are capable of reading network traffic load signal 460 need not respond with explicit signaling, but have an opportunity to consider possibilities to reduce their amount of network access traffic.

Although FIG. 5 shows exemplary components network portion 500, in other implementations, network portion 500 may contain fewer, different, differently-arranged, or additional components than depicted in FIG. 5. Alternatively, or additionally, one or more components of network portion 500 may perform one or more other tasks described as being performed by one or more other components of network portion 500.

FIG. 6 is a flow diagram of an exemplary process 600 for adaptively managing high network loads according to an implementation described herein. Process 600 may be performed, for example, by base station 120. In another implementation, process 600 may be performed by one or more other devices including or excluding base station 120.

Process 600 may include detecting a high cell traffic load (block 610). For example, base station 120 (e.g., network resource monitor 400) may receive utilization information 430 associated with network 100, such as bandwidth utilization by mobile terminals 110. Utilization information 430 may be used to generate an internal resource monitoring signal 440. Base station 120 (e.g., network resource management mechanism 410) may determine if resource monitoring signal 440 is indicative of a heavy traffic load that could cause congestion for wireless access to base station 120.

Process 600 may also include sending, via a broadcast channel, a signaling message indicating the high cell traffic load (block 620) and receiving, from mobile terminals, device-limited network traffic (block 630). For example, base station 120 (e.g., broadcast module 420) may broadcast a network traffic load signal 460 to mobile terminals 110. In one implementation, network traffic load signal 460 may be distributed via a cell-specific broadcast channel for base station 120. For example, network traffic load signal 460 may be included as an additional signal in the system information blocks that give all mobile terminals 110 in the cell particular cell-specific protocol information. Based on receiving network traffic load signal 460, mobile terminals 110 may individually determine to adjust access patterns for transmitting data via wireless access network 130.

Process 600 may further include detecting a return to a normal cell traffic load (block 640) and sending, via the broadcast channel, a signaling message indicating the normal cell traffic load (block 650). For example, base station 120 (e.g., network resource monitor 400) may receive additional utilization information 430 associated with network 100 and generate another internal resource monitoring signal 440. Base station 120 (e.g., network resource management mechanism 410) may determine if the other resource monitoring signal 440 is indicative of a reduced traffic load with no wireless access network congestion.

Systems and/or methods described herein may detect a high traffic load for a wireless access network associated with the network device and may broadcast, to mobile terminals in the wireless access network associated with the network device, a signaling message indicating the high traffic load. The signaling message may cause mobile terminals to selectively limit wireless network access requests to the network device. The systems and/or methods may monitor network utilization and may broadcast another signaling message to indicate a return to a normal traffic load. In one implementation, the signaling messages may be distributed in a new system information block distributed via a broadcast channel for the wireless access network and adapted into technical specifications for the wireless access network.

In contrast with existing congestion reject mechanisms, systems and/or methods described herein provide terminals (e.g., mobile terminals 110) the opportunity to prioritize among their network access requests (e.g., by limiting/delaying less important background activities in order to minimize the consumer visibility) while a network-initiated rejection has significantly higher probability to negatively affect user-initiated connection requests. Furthermore, use of broadcast channel signals can quickly, and with low additional signaling load, inform all terminals in a cell about a high load situation. The systems and/or methods thus enable a larger reduction of the load with a single notification in contrast with network-initiated rejections that inform only one mobile terminal at a time about a high load situation.

Hence the systems and/or methods described herein enable a standardized, dynamic network load control by means of terminal-managed prioritization of the access load. Allowing all terminals in a cell to control the total network load provides functionality for terminals to select/filter wireless network access requests in a way in which negative consumer impact of high network load is minimized Existing reject cause possibilities may remain a subsequent option, in case the network load continues at an overloaded level.

The foregoing description of implementations provides illustration, but is not intended to be exhaustive or to limit the implementations to the precise form disclosed. Modifications and variations are possible in light of the above teachings or may be acquired from practice of the teachings.

In the above, while series of blocks have been described with regard to the exemplary process, the order of the blocks may be modified in other implementations. In addition, non-dependent blocks may represent acts that can be performed in parallel to other blocks. Further, depending on the implementation of functional components, some of the blocks may be omitted from one or more processes.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

It should be emphasized that the term "comprises/comprising" when used in this specification is taken to specify the presence of stated features, integers, steps or components but does not preclude the presence or addition of one or more other features, integers, steps, components, or groups thereof.

Further, certain portions of the implementations have been described as "logic" that performs one or more functions. This logic may include hardware, such as a processor, a microprocessor, an application specific integrated circuit, or a field programmable gate array, software, or a combination of hardware and software.

No element, act, or instruction used in the present application should be construed as critical or essential to the implementations described herein unless explicitly described as such. Also, as used herein, the article "a" is intended to include one or more items. Further, the phrase "based on" is intended to mean "based, at least in part, on" unless explicitly stated otherwise.

What is claimed is:

1. A method, comprising:
    detecting, by a network device, a high traffic load for a wireless access network associated with the network device, wherein the detecting includes identifying a trend toward a particular capacity limit that is projected to be achieved within a certain time period;
    sending, by the network device via a broadcast channel to a plurality of mobile terminals including a first mobile terminal and a second mobile terminal, a signaling message providing each mobile terminal an opportunity to individually change network connection behavior without network-initiated resection of network access requests, the first and second mobile terminals each having network access requests for a user-initiated connection with the wireless access network and automatically initiated network access requests for one or more background applications;
    receiving the signaling message by the first and second mobile terminals;
    responsive to receiving the signaling message, each of the first and second mobile terminals individually implementing terminal-managed access prioritization that determines a network connection behavior for their respective network access requests by taking effect on traffic load into account before transmitting network access requests to avoid negative user experiences for the user-initiated connections of the plurality of mobile terminals as a collective, including:
        the first mobile terminal individually determining to change its network connection behavior by reducing the transmission of network access requests for the one or more background applications relative to before receiving the signaling message; and
        the second mobile terminal individually determining to transmit network access requests for the user-initiated connection and the one or more background applications under an unchanged network connection behavior relative to before receiving the signaling message; and
    receiving and accepting, by the wireless access network, the network access requests of the first mobile terminal and the second mobile terminal.

2. The method of claim 1, further comprising:
    monitoring, by the network device, utilization information associated with the wireless access network, wherein the detecting is based on the utilization information.

3. The method of claim 1, wherein the signaling message is included in a system information block.

4. The method of claim 3, wherein the system information block includes:
    a two-bit block configured to indicate one of four traffic load levels for the wireless access network.

5. The method of claim 1, wherein identifying the trend toward the particular capacity limit that is projected to be achieved within the certain time period comprises comparing multiple resource monitoring signals over a time period.

6. The method of claim 1, wherein the network device includes a base station for the wireless access network.

7. The method of claim 1, further comprising:
    detecting a normal traffic load for the wireless access network associated with the network device; and
    sending, via the broadcast channel and to the plurality of mobile terminals, a signaling message indicating the normal traffic load.

8. A network device, comprising:
    a memory that stores a plurality of instructions; and
    a processor that by execution of the instructions is configured to:
        detect a high traffic load for a wireless access network associated with the network device, wherein the detecting includes identifying a trend toward a particular capacity limit that is projected to be achieved within a certain time period,
        broadcast, to a plurality of mobile terminals including a first mobile terminal and a second mobile terminal in the wireless access network associated with the network device, a signaling message providing each mobile terminal an opportunity to individually change network connection behavior without network-initiated rejection of network access requests, the first and second mobile terminals each having network access requests for a user-initiated connection with the wireless access network and automatically initiated network access requests for one or more background applications,
        wherein responsive to receiving the signaling message, each of the first and second mobile terminal individually implementing terminal-managed access prioritization that determines their respective wireless network access request behavior by taking effect on traffic load into account before transmitting network access requests to avoid negative user experiences for the user-initiated connections of the plurality of mobile terminals as a collective,
        wherein the first mobile terminal individually determines to change its network behavior by reducing transmission of network access requests for the one or more background applications relative to before receiving the signaling message, and
        wherein the second mobile terminal individually determines to transmit network access requests for the user-initiated connection and the one or more background applications under an unchanged network connection behavior relative to before receiving the signaling message; and
        receive and accept the network access requests from the first mobile terminal and the second mobile terminal.

9. The device of claim 8, wherein the processor is further configured to monitor utilization information associated with the wireless access network.

10. The device of claim 8, wherein the signaling message is broadcast using a designated broadcast channel for the network device.

11. The device of claim 10, wherein the signaling message is included within a system information block delivered via the broadcast channel.

12. The device of claim 11, wherein the signaling message includes a one-bit indicator.

13. The device of claim 11, wherein the signaling message includes a two-bit indicator.

14. The device of claim 8, wherein, when detecting the high traffic load, the processor is further configured to execute instructions in the memory to:
compare multiple resource monitoring signals over a time period.

15. The device of claim 8, wherein the network device includes a base station for the wireless access network.

16. A non-transitory computer-readable medium including instructions executable by at least one processor, the computer-readable medium comprising:
one or more instructions to detect a high traffic load for a wireless access network associated with a network device, wherein the detecting includes identifying a trend toward a particular capacity limit that is projected to be achieved within a certain time period;
one or more instructions to send, via a broadcast channel, to a plurality of mobile terminals including a first mobile terminal and a second mobile terminal, a signaling message, the signaling message providing each mobile terminal an opportunity to individually change network connection behavior without network-initiated rejection of network access requests, the first and second mobile terminals each having network access requests for a user-initiated connection with the wireless access network and automatically initiated network access requests for one or more background applications, wherein, responsive to receiving the signaling message, each of the first and second mobile terminals individually implementing terminal-managed access prioritization that determines a network connection behavior for their respective network requests including taking effect on traffic load into account before transmitting network access requests to avoid negative user experiences for the user-initiated connections of the plurality of mobile terminals as a collective:
the first mobile terminal individually determines to change its network behavior by reducing transmission of network access requests for the one or more background applications relative to before receiving the signaling message, and
the second mobile terminal individually determines to transmit network access requests for the user-initiated connection and the one or more background applications under an unchanged network connection behavior relative to receiving the signaling message;
one or more instructions to receive and accept the network access requests from the first mobile terminal and the second mobile terminal;
one or more instructions to detect a return to a normal traffic load for the wireless access network; and
one or more instructions to send, via the broadcast channel, to the plurality of mobile terminals including the first mobile terminal and the second mobile terminal, another signaling message indicating the normal traffic load.

17. The non-transitory computer-readable medium of claim 16, wherein the one or more instructions to send the signaling message include one or more instructions to provide an indicator bit in a system information block for the wireless access network.

18. The non-transitory computer-readable medium of claim 16, further comprising:
one or more instructions to monitor utilization information associated with the wireless access network.

* * * * *